United States Patent Office.

HENRY W. JOSLIN, OF JERSEY CITY, NEW JERSEY.

Letters Patent No. 111,549, dated February 7, 1871.

IMPROVEMENT IN THE MANUFACTURE OF RUBBER FLOOR-CLOTHS, &c.

The Schedule referred to in these Letters Patent and making part of the same.

*To all whom it may concern:*

Be it known that I, HENRY W. JOSLIN, of Jersey City, in the county of Hudson and State of New Jersey, have invented a new and useful Improvement in Rubber Cloth, of which the following is a full, clear, and exact description.

My invention consists in the production of an inlaid rubber cloth, in which varied patterns and colors of India rubber are incorporated with a base of rubber cloth of different color, in such manner as to present a flush or level surface, said article being applicable as floor-cloth and for numerous other purposes.

To make rubber cloth in accordance with my invention I first prepare a plain rubber-cloth base, of any desired color and thickness, and inlay it, when in a raw state, or before vulcanizing, and as it comes from the calendering rolls, as follows:

I take a sheet or strip of unvulcanized rubber, of different color from the base and somewhat thinner than it, and pass the same in between rolls, the upper one of which has a raised profile of the desired pattern on it, as produced by knife-like projections with the spaces in between them, which form the body of the pattern, of a depth corresponding with the thickness of the rubber, while the intervening or surrounding spaces are of a greater depth. In this way the rubber pattern is cut out and left in the roll within or between the knives, in a raised relation to the balance of the rubber, so that, on passing the rubber-cloth base with its rubber face downward over the roll containing the rubber pattern, it will pick up the latter onto its surface and hold the same by adhesion.

When an interior pattern, that is, a pattern within a pattern, is required, then a repetition of the same process takes place with a different color of rubber from that used for the first pattern, passing the rubber-cloth base with the first or main pattern on it over the roll containing the interior or additional pattern, which is thus left mounted on the first pattern.

Such mounting of rubber patterns on the rubber-cloth base may be repeated indefinitely, according to the ornamental or figured appearance it is desired to give the rubber-cloth base.

After the rubber-cloth base has been thus studded with a rubber pattern or patterns on its surface the whole is then put in a press, with suitable precautions against sticking, and power applied to sink said pattern or patterns into the rubber surface of the base till the same are flush with said surface, such action being repeated for a succession or series of feed through the press when the article is in the form of a lengthened piece or strip, with the patterns repeated on its surface by successive actions of the rolls, as hereinbefore referred to.

A rolling-mill may be substituted for the press, if preferred.

The article is then rolled up face-side innermost, with suitable protection against sticking, and vulcanized as plain rubber cloth is ordinarily done. This produces a finished article which resembles a fancy-painted rubber cloth, of different colors and patterns, according to the design required, but which is in reality an inlaid rubber cloth, the pattern of which is not liable to be disfigured or obliterated either by wear or washing.

When referring in this specification to rubber, of course the various well-known or other suitable preparations of rubber are included.

What is here claimed, and desired to be secured by Letters Patent, is—

1. An inlaid rubber cloth, substantially as specified.

2. The process, substantially as herein described, of making rubber cloth, having a variegated surface, by imbedding, through pressure, into a rubber-cloth base, while raw, a pattern or patterns of different-colored rubber, and afterward vulcanizing the whole.

H. W. JOSLIN.

Witnesses:
FRED. HAYNES,
FERD. TUSCH.